United States Patent [19]

Sweeney

[11] Patent Number: 5,032,239

[45] Date of Patent: Jul. 16, 1991

[54] CONVERSION OF CELLULOSIC AGRICULTURAL WASTES

[76] Inventor: Charles T. Sweeney, 106 W. Bagdad Ave., Round Rock, Tex. 78664

[21] Appl. No.: 328,278

[22] Filed: Mar. 24, 1989

[51] Int. Cl.$^5$ .............................................. A23K 1/00
[52] U.S. Cl. .................... 204/131; 204/103; 426/615; 426/635; 426/636; 426/807; 435/165
[58] Field of Search ............... 426/615, 807, 641, 636, 426/635; 204/103, 131

[56] References Cited

U.S. PATENT DOCUMENTS

| | | | |
|---|---|---|---|
| 4,176,203 | 11/1979 | Lagerstrom | 426/636 |
| 4,182,780 | 1/1980 | Lagerström et al. | 426/636 |
| 4,248,681 | 2/1981 | Sweeney | 204/103 |
| 4,444,621 | 4/1984 | Lindahl | 162/26 |
| 4,649,113 | 3/1987 | Gould | 426/807 |

Primary Examiner—John F. Niebling
Assistant Examiner—Arun S. Phasge
Attorney, Agent, or Firm—Neal J. Mosely

[57] ABSTRACT

A method for conversion of comminuted cellulosic agricultural wastes into a form edible by ruminant animals comprises treating such wastes, e.g., straw, corn husks, cotton wastes, peanut shells, saw dust, etc. by spraying with an aqueous solution of a mixed oxidant gas, at a pH of about 11–12, to produce a water content of less than 40% and a pH of about 11.4–11.7 in the waste. The mixed-oxidant gas is preferably produced by a gas generator comprising an electrolytic cell having an anode compartment, a cathode compartment and a membrane separating the compartments to permit only a limited flow of electrolyte therebetween. When a low salt concentration solution is electrolyzed in this cell, the output is a mixed oxidant gas containing chlorine and various oxygen-containing species. Another gas generator which may be used is that shown in U.S. Pat. No. 4,248,681. The oxidant gas produced from dilute salt solutions contains chlorine, chlorine dioxide and other oxygen-containing gases. After a reaction time from several hours up to several days, the product obtained is essentially free from chemically combined lignins and has been substantially hydrolyzed to sugars, and is a satisfactory feed for ruminant animals. Alternatively, the wastes may be treated with aqueous caustic to the desired pH and water content and the mixed oxidant gas circulated through the waste and absorbed therein.

23 Claims, 5 Drawing Sheets

CONVERSION OF CELLULOSIC AGRICULTURAL WASTES

BACKGROUND OF THE INVENTION

1. Field of the Invention

This invention relates to new and useful improvements in conversion of cellulosic wastes into a form edible and digestible by ruminant animals.

2. Brief Description of the Prior Art

Crop residues, i.e., cellulosic wastes, such as straw, corn husks, cotton wastes, peanut shells, saw dust, etc., offer a tremendous feed resource for ruminant animals. For each pound to corn, wheat, milo, etc., produced there is left a cellulosic residue of about one pound. A small amount of these residues are actually used as animal feed, e.g., by grazing of fields after harvesting the grain.

These cellulosic wastes, such as straw, corn husks, cotton wastes, peanut shells, saw dust, etc., are highly lignified fibers which are digested poorly, if at all, by ruminants. For example, wheat straw is only digested about 35–40% by ruminants as compared to 55–60% for conventional forage such as alfalfa and 80–90% for grains. Some of these cellulosic wastes, e.g., cotton gin trash, are useful only for burning and have a zero or even negative economic value.

It has been known for forty years that the lignin in cellulosic wastes is responsible for the low digestability. Recently, work at the University of Illinois, University of Nebraska and Texas Tech University has shown that the lignin in cellulosic wastes can be broken down by treatment with alkaline hydrogen peroxide to produce a cellulosic residue which is 55–75% digestible. The problem is utilization of this treatment has been one of logistics as well as the expense of the hydrogen peroxide in the quantities required.

The cellulosic wastes are readily available on the farm, or at cotton gins in the case of gin trash, but these materials are bulky and expensive to transport. It is therefore uneconomical to move the cellulosic wastes to chemical processing facilities. The only practical way, at present, to treat these wastes would involve in-situ treatment and consumption of the treated materials on the farm. Central processing might be practical in the case of cotton gin trash because of the quantities collected at central locations. The economics of the alkaline hydrogen peroxide treatment is another matter. Even in the quantities used, hydrogen peroxide is expensive and the cost of treatment makes the entire process of treatment economically doubtful. The development of a cheap process for manufacture of hydrogen peroxide at the point of use on the farm might overcome this problem.

The inventor, Charles T. Sweeney, has recently conducted research into the use of various mixed oxidant gases in the conversion of cellulosic wastes which offers the prospect of overcoming both the reagent cost and logistical problems encountered in the preparation of ruminant feeds. This research has involved the utilization of various mixed oxidant gases produced by various electrolytic cells.

Chlorinating systems using electrolytic cells for production of chlorine for chlorinating bodies of water are shown in Murray U.S. Pat. No. 2,361,663, Oldershaw U.S. Pat. No. 3,351,542, Colvin U.S. Pat. No. 3,378,479, Kirkham U.S. Pat. No. 3,669,857, and Yates U.S. Pat. No. 4,097,356. These electrolytic cells are disclosed in a variety of configurations and most of the cells utilize ion-permeable membranes separating the anode and cathode-containing compartments.

Ion-permeable membrane technology used in electrolytic cells is well developed. Ion-permeable membranes used in electrolytic cells have ranged from asbestos diaphragms to carboxylate resin polymers to perfluorosulfonic acid polymer membranes. The perfluorosulfonic acid membranes were developed by Dupont for use in electrolytic cells. Anion exchange membranes, of polymers having anion functionality, are made by Ionics Inc. of Watertown, Mass.

Dotson U.S. Pat. No. 3,793,163 discloses the use of Dupont perfluorosulfonic acid (NAFION) membranes in electrolytic cells and makes reference to U.S. Pat. Nos. 2,636,851; 3,017,338; 3,560,568; 3,496,077; 2,967,807; 3,282,875 and British Patent 1,184,321 as disclosing such membranes and various uses thereof.

Walmsley U.S. Pat. No. 3,909,378 discloses another type of fluorinated ion exchange polymer used in membranes for electrolytic cells for electrolysis of salt solutions.

Further discussion of membrane technology used in electrolytic cells may be found in Butler U.S. Pat. No. 3,017,338, Danna U.S. Pat. No. 3,775,272, Kircher U.S. Pat. No. 3,960,697, Carlin U.S. Pat. No. 4,010,085, Westerlund U.S. Pat. No. 4,069,128 and Sweeney U.S. Pat. No. 4,804,449.

Discussion of perfluorosulfonic acid (NAFION) membranes is also discussed in the technical literature, e.g., Dupont Magazine, May-June 1973, pages 22–25 and a paper entitled "Perfluorinated Ion Exchange Membrane" by Grot, Munn and Walmsley, presented to the 141st National Meeting of the Electro-Chemical Society, Houston, Tex., May 7–11, 1972.

The structure of electrodes used in electrolytic cells is set forth in most of the patents listed above. Additionally, the following U.S. Patents disclose particular configurations of anodes or cathodes used in electrolytic cells.

Giacopelli U.S. Pat. No. 3,375,184 discloses an electrolytic cell with controllable multiple electrodes which are flat plates of wedge-shaped configuration. Ettel U.S. Pat. No. 3,821,097 discloses the use of flat plates in electroplating cells. Lohrberg U.S. Pat. No. 3,951,767 discloses the use of flat plate electrolytic anodes having grooves along the bottoms thereof for conducting gas bubbles generated in the electrolytic process. Andreoli U.S. Pat. No. 565,953 discloses electroplating apparatus having a plurality of metal screens which are not connected in the electric circuit and function to plate out the metal being separated by the electrolysis.

In "The chlorine dioxide content of chlorine obtained by electrolysis of salt", Electrochemical Technology 5, 56–58 (1967) Western and Hoogland report that chlorine dioxide is not produced in the electrolysis of salt in the absence of chlorates.

Sweeney U.S. Pat. No. 4,256,552 discloses an electrolytic generator for production of chlorine, for chlorination of swimming pools, water systems, etc., in which a bipolar electrode is positioned in the anode compartment between the anode and the cation-exchange membrane in the wall separating the compartments. Sweeney U.S. Pat. No. 4,334,968 discloses improvements on the cell or generator of U.S. Pat. No. 4,256,552 and discloses the production of chlorine dioxide in the cell. Sweeney U.S. Pat. No. 4,248,681 discloses a method of producing chlorine/chlorine dioxide mixtures in the cells of U.S. Pat. Nos. 4,256,552 and 4,334,968 and gives some optimum operating conditions. Sweeney U.S. Pat. No. 4,308,117 discloses a cell having three compartments, with the anode and cathode in the outer compartments and the bipolar electrode in the central compartment. A cation-exchange membrane is positioned in the wall between the central compartment and the cathode compartment, while an anion-exchange membrane in positioned in the wall between the central compartment and the anode compartment. Sweeney U.S. Pat. No. 4,324,635 discloses a cell having an anode compartment, a cathode compartment, and a separating wall with a cathode-exchange membrane therein. The cell includes a pump circulating some of the cathode compartment solution to the anode compartment for pH control. The gases produced by these cells has come to be referred to as mixed oxidant gases which contain chlorine, chlorine oxides, oxygen and other oxygen species.

In subsequent studies, it has been found that cells of the type shown in patents U.S. Pat. Nos. 4,256,552, 4,334,968 and 4,248,681 can be operated with very low salt concentrations and, under such conditions, produce oxidizing gases containing very small amounts of chlorine or chlorine compounds. Sweeney U.S. Pat. No. 4,804,449 discloses the use of nonionic membranes of Kanecaron in place of Nafion in electrolytic cells for production of mixed oxidant gases. Kanecaron fibers are of a modacrylic composition of acrylic polymeric structure having 35–85% wt. acrylonitrile units. Kanecaron fibers used in these cells are modacrylic fibers of this general type composed of 50% acrylonitrile and 50% vinyl chloride fibers.

SUMMARY OF THE INVENTION

One object of this invention is to provide a new and improved method for the gas phase or solution treatment of cellulosic wastes, e.g., straw, corn husks, cotton wastes, peanut shells, saw dust, etc., to convert them to a form edible and digestible by ruminant animals.

Another object is to provide a new and improved method for the treatment of cellulosic wastes, e.g., straw, corn husks, cotton wastes, peanut shells, saw dust, etc., by spraying with an alkaline solution of a mixed oxidant gas containing chlorine, chlorine oxides, oxygen and other oxygen species to produce a pH of 11.4–11.7 and water content of less than 40% in the cellulosic wastes and allowing reaction to convert them to a form edible and digestible by ruminant animals.

Another object is to provide a new and improved method for the treatment of cellulosic wastes, e.g., straw, corn husks, cotton wastes, peanut shells, saw dust, etc., by spraying with an alkaline solution to produce a pH of 11.4–11.7 and water content of less than 40% in the cellulosic wastes, then treating with a mixed oxidant gas containing chlorine, chlorine oxides, oxygen and other oxygen species and allowing reaction to convert the wastes to a form edible and digestible by ruminant animals.

Another object is to provide a new and improved method for the treatment of cellulosic wastes, e.g., straw, corn husks, cotton wastes, peanut shells, saw dust, etc., by spraying with an alkaline solution of a mixed oxidant gas containing chlorine, chlorine oxides, oxygen and other oxygen species, produced by a membrane-type electrolytic cell, to produce a pH of 11.4–11.7 and water content of less than 40% in the cellulosic wastes and allowing reaction to convert them to a form edible and digestible by ruminant animals.

Another object is to provide a new and improved method for the treatment of cellulosic wastes, e.g., straw, corn husks, cotton wastes, peanut shells, saw dust, etc., by spraying with an alkaline solution to produce a pH of 11.4–11.7 and water content of less than 40% in the cellulosic wastes, then treating with a mixed oxidant gas containing chlorine, chlorine oxides, oxygen and other oxygen species, produced by a membrane-type electrolytic cell, and allowing reaction to convert the wastes to a form edible and digestible by ruminant animals.

Another object is to provide a new and improved method for the treatment of cellulosic wastes, e.g., straw, corn husks, cotton wastes, peanut shells, saw dust, etc., by spraying with an alkaline solution of a mixed oxidant gas containing chlorine, chlorine oxides, oxygen and other oxygen species, produced by a membrane-type electrolytic cell having an anode, a cathode, and an additional electrode positioned between the anode and cathode and maintained at a lower potential than the anode relative to the cathode, to produce a pH of 11.4–11.7 and water content of less than 40% in the cellulosic wastes and allowing reaction to convert them to a form edible and digestible by ruminant animals.

Another object is to provide a new and improved method for the treatment of cellulosic wastes, e.g., straw, corn husks, cotton wastes, peanut shells, saw dust, etc., by spraying with an alkaline solution to produce a pH of 11.4–11.7 and water content of less than 40% in the cellulosic wastes, then treating with a mixed oxidant gas containing chlorine, chlorine oxides, oxygen and other oxygen species, produced by a membrane-type electrolytic cell, having an anode, a cathode, and an additional electrode positioned between the anode and cathode and maintained at a lower potential than the anode relative to the cathode, and allowing reaction to convert the wastes to a form edible and digestible by ruminant animals.

Another object of this invention is to provide a novel composition of matter comprising an alkaline solution of a mixed oxidant gas containing chlorine, chlorine oxides, oxygen and other oxygen species, etc., with a mixed oxidant content of 0.01–7.0% wt. which is useful in various oxidizing reactions.

Other objects will be apparent from time to time throughout the specification and claims as hereinafter related.

These objects and other objects of the invention are accomplished by a method for conversion of comminuted cellulosic agricultural wastes into a form edible by ruminant animals which comprises treating such wastes, e.g., straw, corn husks, cotton wastes, peanut shells, saw dust, etc. by spraying with an aqueous solution of a mixed oxidant gas, at a pH of about 11–12, to produce a water content of less than 40% and a pH of about 11.4–11.7 in the waste. The mixed-oxidant gas is preferably produced by a gas generator comprising an electrolytic cell having an anode compartment, a cathode compartment and a membrane separating the compartments to permit only a limited flow of electrolyte therebetween. When a low salt concentration solution is electrolyzed in this cell, the output is a mixed oxidant gas containing chlorine and various oxygen-containing species. Another gas generator which may be used is that shown in U.S. Pat. No. 4,248,681. The oxidant gas produced from dilute salt solutions contains chlorine, chlorine dioxide and other oxygen-containing gases. After a short reaction time, the product obtained is essentially free from chemically combined lignins and has been substantially hydrolyzed to sugars, and is a satisfactory feed for ruminant animals. Alternatively, the wastes may be treated with aqueous caustic to the desired pH and water content and the mixed oxidant gas circulated through the waste and absorbed therein.

DESCRIPTION OF PREFERRED EMBODIMENTS OF THIS PROCESS

In a preferred method for conversion of comminuted cellulosic agricultural wastes into a form edible by ruminant animals the wastes, e.g., straw, corn husks, cotton wastes, peanut shells, saw dust, etc. are sprayed with an aqueous solution of a mixed oxidant gas containing chlorine and various oxygen-containing species, at a pH of about 11-12, to produce a water content of less than 40% and a pH of about 11.4-1.7 in the waste.

Figure 1:
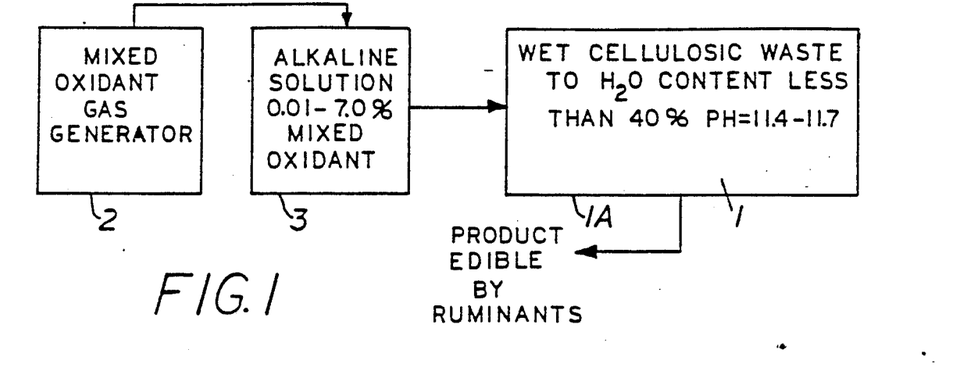
FIG. 1 is a schematic view of a method or system for treatment of cellulosic wastes in accordance with a preferred embodiment of this invention to produce a product edible by ruminants.

A schematic view of this method or system is shown in FIG. 1 of the drawings wherein a supply of cellulosic wastes 1, e.g., straw, corn husks, cotton wastes, peanut shells, saw dust, etc., is comminuted to a relatively small size and introduced into storage zone 1a. A mixed oxidant generator 2, i.e., electrolytic cell, produces an oxidant gas mixture which is introduced into an absorber 3 where it is dissolved in water with appropriate adjustment of pH to an alkaline condition to produce a mixed oxidant solution of 0.01-7.0% as a ph of 7.5-12.0. The mixed-oxidant gas is a mixture of chlorine, chlorine oxides, and various oxygen species, such as oxygen, hydrogen peroxide, ozone, etc., preferably produced by a gas generator 2 comprising an electrolytic cell having an anode compartment, a cathode compartment and a membrane separating the compartments to permit only a limited flow of electrolyte therebetween. When a low salt concentration solution is electrolyzed in this cell, the output is a mixed oxidant gas containing chlorine and various oxygen-containing species. Another gas generator which may be used is that shown in U.S. Pat. No. 4,248,681. The oxidant gas produced from dilute salt solutions contains chlorine, and various oxygen-containing gases. Specific preferred embodiments of the mixed-oxidant gas generator cells 2 are shown in FIGS. 3-17, below.

The solution from absorber 3 is mixed with concentrated aqueous NaOH and the mixture may be diluted with water to the desired alkalinity and is sprayed on the comminuted cellulosic wastes in storage bin or zone 1a to produce a water content of less than 40%, preferably less than 35%, and pH of 11.4-11.7 on the wastes. After a storage time of several hours or more, the cellulosic wastes are converted to a delignified condition with an appreciable conversion of cellulose to sugars. The product is digestible to an extent in excess of 55% by ruminant animals.

In another method for conversion of comminuted cellulosic agricultural wastes into a form edible by ruminant animals the wastes, e.g., straw, corn husks, cotton wastes, peanut shells, saw dust, etc. are sprayed with a concentrated aqueous alkaline solution, to produce a water content of less than 40% and a pH of about 11.4-11.7 in the waste. The treated waste is then treated with a mixed oxidant gas containing chlorine and various oxygen-containing species, as described above.

Figure 2:
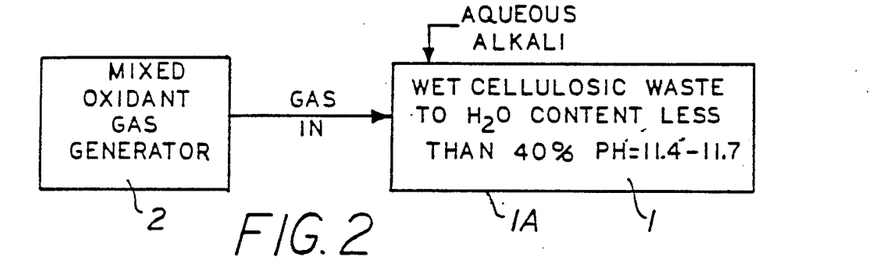
FIG. 2 is a schematic view of a method or system for treatment of cellulosic wastes in accordance with another embodiment of this invention to produce a product edible by ruminants.

A schematic view of this method or system is shown in FIG. 2 of the drawings wherein a supply of cellulosic wastes 1, e.g., straw, corn husks, cotton wastes, peanut shells, saw dust, etc., is comminuted to a relatively small size and introduced into a storage zone 1a. An aqueous alkaline solution at pH 11.0–13.0 is sprayed on the comminuted cellulosic wastes in storage bin or zone 1a to produce a water content of less than 40%, preferably less than 35%, and pH of 11.4–11.7 on the wastes. A mixed oxidant generator 2, i.e., electrolytic cell, as described for FIG. 1, produces an oxidant gas mixture which is introduced into storage bin or zone 1a and absorbed on the comminuted cellulosic wastes 1. After a storage time from several hours up to several days, the cellulosic wastes are converted to a delignified condition with an appreciable conversion of cellulose to sugars. The product is digestible to an extent in excess of 55% by ruminant animals.

MIXED OXIDANT GAS GENERATORS

Figure 3:
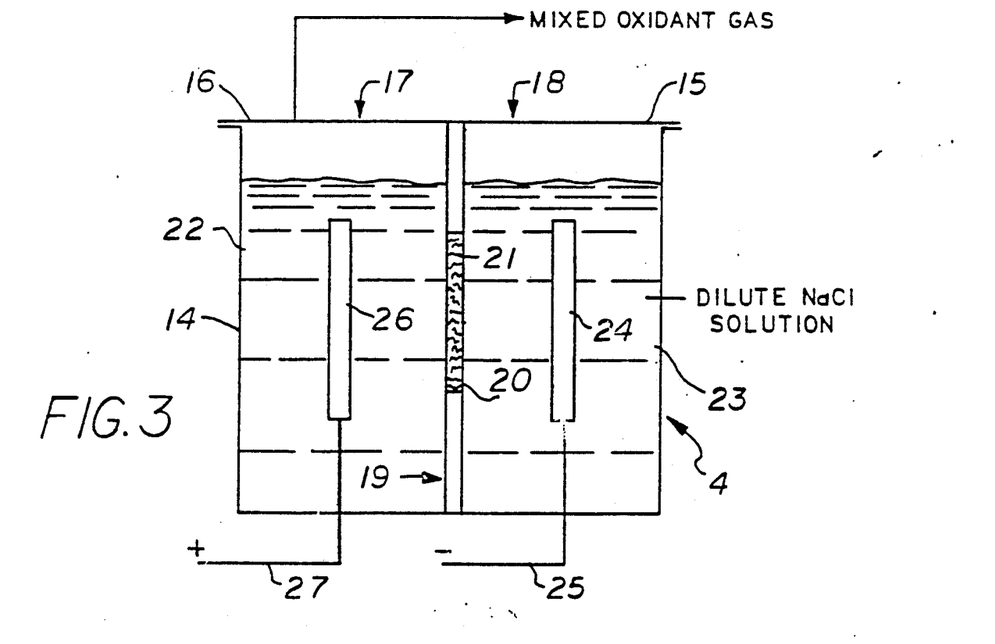
FIG. 3 is a schematic view, in elevation, of an electrolytic generator, of the membrane type, to be used in the method or system shown in FIGS. 1 or 2.

In FIG. 3, there is shown a schematic view, in elevation, of an electrolytic generator 4, of the membrane type, to be used in the method or system shown in FIGS. 1 or 2 Electrolytic generator 4 consists of a hollow container 14 having a removable cover 15 sealed in place having an opening 16 for introduction of a chloride salt (sodium chloride), and openings 17 and 18 for introduction of water. Hollow container 14 is divided by a vertically extending wall 19 which has a window opening 20 in which there is positioned ion-permeable membrane 21 which conducts cations, e.g. sodium ions, preferably of the type conventionally used in electrolytic cells provided with membrane separation of the anode and the cathode compartments. A preferred membrane is a fluorinated polymer, e.g. perfluorosulfonic acid polymers, such as NAFION Registered Trademark, manufactured by Dupont. Alternatively, a nonionic membrane of finely woven KANECARON fibers may be used.

Wall member 19 including membrane 21 divides the interior of container 14 into an anode compartment 22 and a cathode compartment 23. A cathode 24 is positioned in cathode compartment 23 and connected by electric lead 25 to a point external to container 14. Anode 26 is positioned in anode compartment 22 and is connected by electric lead 27 to a point external to container 14. The apparatus is provided with a suitable power supply connected to electric leads 25 and 27.

OPERATION

The electrolytic generator described and shown in FIG. 3 is a more or less conventional membrane cell for production of chlorine. In the electrolytic generator shown, the cell is charged with water in both the anode compartment 22 and the cathode compartment 23 to a level above the top of the various electrodes but leaving a sufficient space at the top for the collection of gases. Common table salt (sodium chloride) was added to the water in the anode compartment. In carrying out this process, any soluble chloride salt may be used, e.g. sodium chloride, potassium chloride, lithium chloride, rubidium chloride, cesium chloride, ammonium chloride, magnesium chloride, etc., although for economic reasons sodium chloride is preferred. When the cell is operated at a low salt concentration, the gas produced in the anode compartment 22 is a mixture of chlorine and oxygen, with small amounts of other oxidants. This mixed oxidant gas may be absorbed into aqueous alkali (pH 7.5–12.0) to a concentration of 0.01–7.0% to yield a solution usable in the method shown in FIG. 1 or the gas may be used in the method shown in FIG. 2. The other cells described below produce a mixed oxidant gas which is superior in this method, but the gas produced in the cell of FIG. 3 may be used. The mixed oxidant gas is absorbed in aqueous alkaline solution. The solubility increases with increase in pH of the solution. Mixed oxidant gas solutions have concentrations of 0.01–7.0% as the pH increases from about 7.5 up to about 12.0. These solutions are used in the method shown in FIG. 1 and the gases in the method of FIG. 2.

OTHER MIXED OXIDANT GENERATORS

The description of FIGS. 4–17, below, is essentially a repetition of the description in Sweeney U.S. Pat. No. 4,248,681, and analogous or equivalent generators, but is repeated here to avoid referring to an external document in describing the present invention. This invention comprises a method for the treatment of cellulosic wastes using the mixed oxidant gases produced by the apparatus of Sweeney U.S. Pat. No. 4,248,681, and analogous or equivalent generators, when operated under certain selected conditions. It is therefore deemed appropriate to repeat the description of the Sweeney apparatus and operating procedure to provide a setting for the present invention.

Figure 4:
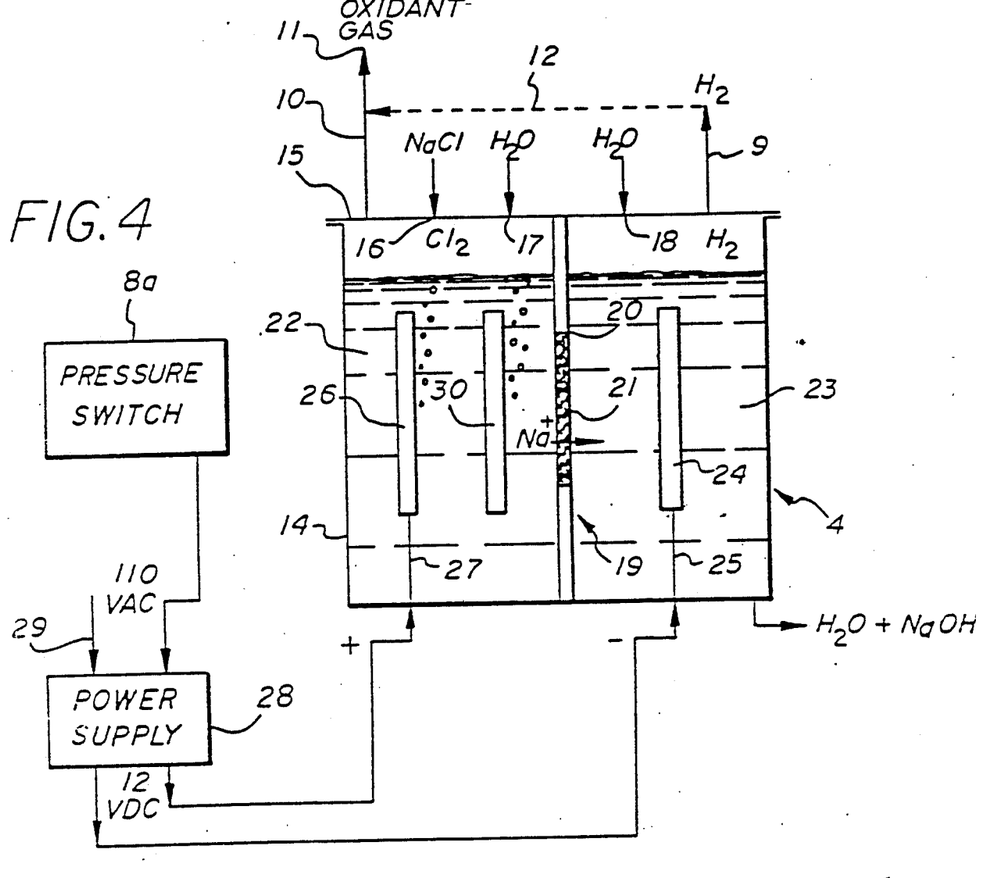
FIG. 4 is a schematic view, in elevation, of a preferred embodiment of the electrolytic generator, of the type shown in U.S. Pat. No. 4,248,681, to be used in the method or system shown in FIGS. 1 or 2.

In FIG. 4, electrolytic generator 4 consists of a hollow container 14 having a removable cover 15 sealed in place having an opening 16 for introduction of a chloride salt (sodium chloride), and openings 17 and 18 for introduction of water. Hollow container 14 is divided by a vertically extending wall 19 which has a window opening 20 in which there is positioned ion-permeable membrane 21 which conducts cations, e.g. sodium ions, preferably of the type conventionally used in electrolytic cells provided with membrane separation of the anode and the cathode compartments. The preferred membranes are fluorinated polymers, e.q. perfluorosulfonic acid polymers, such as NAFION Registered Trademark, manufactured by Dupont or a nonionic KANECARON fiber membrane.

Wall member 19 including membrane 21 divides the interior of container 14 into an anode compartment 22 and a cathode compartment 23. A cathode 24 is positioned in cathode compartment 23 and connected by electric lead 25 to a point external to container 14. Anode 26 is positioned in anode compartment 22 and is connected by electric lead 27 to a point external to container 14. The apparatus is provided with a power supply, such as a transformer 28 powered by 110 volt power source 29 and providing a 12 volt D.C. output connected to electric leads 25 and 27. An electrically neutral (bipolar) electrode 30 is positioned in anode compartment 22. The bipolar electrodes may be positioned anywhere in the anode compartment, e.g., in front of, to the side of, or behind the anode relative to the cathode 24 and membrane 21. In this embodiment, however, the bipolar electrodes 30 are positioned in a direct line between anode 26 and cathode 24 and adjacent to ion-permeable membrane 21. Electrode 30 is electrically neutral (bipolar) in the sense that it is not connected by lead wire to the electric circuit energizing the anode 26 and cathode 24 to effect electrolytic decomposition of a salt solution.

Figure 5:
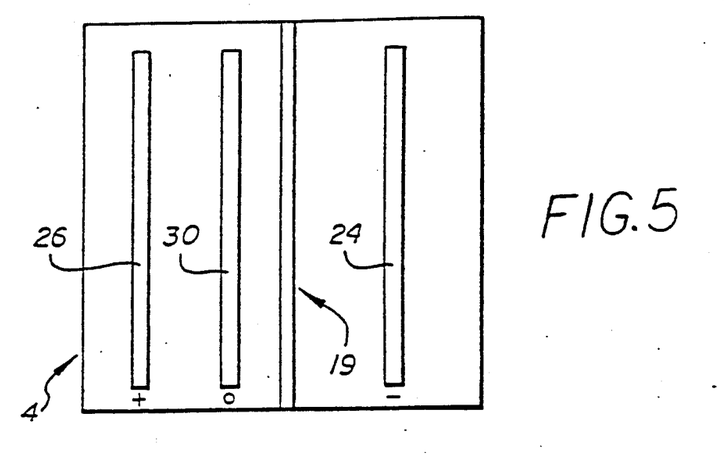
FIG. 5 is a plan view of the electrolytic generator shown in FIG. 4.

In FIG. 5, which is a plan view of the mixed oxidant gas generator 4, the plate-like construction of the various electrodes 24, 26, and 30 is seen. It has been found experimentally that better yields are obtained by increasing the effective area of the anode. Thus, flat-plate electrodes are preferred in the oxidant gas generator of this invention, although in some applications, the cylindrical electrodes or other shape may be used. The cathode 24 is preferably a flat-plate of steel or the like. The anode 26 and the electrically neutral (bipolar) electrode 30 are preferably flat plates of carbon.

OPERATION

The electrolytic generator described and shown in FIGS. 4 and 5 has been tested and found to be a substantial improvement over more conventional electrolytic chlorine generators and under certain conditions produce novel oxidant gas compositions.

In the electrolytic generator shown, the cell is charged with water in both the anode compartment 22 and the cathode compartment 23 to a level above the top of the various electrodes but leaving a sufficient space at the top for the collection of gases. Common table salt (sodium chloride) was added to the water in the anode compartment. In carrying out this process, any soluble chloride salt may be used, e.g. sodium chloride, potassium chloride, lithium chloride, rubidium chloride, cesium chloride, ammonium chloride, magnesium chloride, etc., although for economic reasons sodium chloride is preferred. The ion-permeable membrane 21 in the cell was Dupont NAFION, although nonionic KANECARON membrane may be used. Neutral (bipolar) electrode 30 was placed approximately one inch from the membrane. 12 volt D.C. were applied an monitored by a D.C. ammeter in the circuit.

The system was turned on. The current flow was 0.250 A; voltage readings of the solution were nearly constant throughout the anode compartment. This indicated that the anode compartment represented a single uniform resistance relative to the cathode. A potential difference between the anode and the neutral (bipolar) electrode was 0.9 V.D.C. There was immediate, visible generation of hydrogen at the cathode. At this current level, there is a substantial lag in the production of gases in the anode compartment. After a short period of time, however, gas begins to form at both the anode 26 and the neutral (bipolar) electrode 30.

The gas produced at the anode 26 and the neutral (bipolar) electrode 30 was unexpectedly found to consist of a mixture of chlorine and chlorine dioxide when a high concentration of salt is used. The proportions of operation and in some cases the chlorine dioxide is present in a substantial excess over the chlorine. When the current is increased to about 10-11 A. for full production, there is vigorous generation of the gas mixture at anode 26 and neutral (bipolar) electrode 30. When operating at full voltage and full current, there is a substantial and measurable potential measured across the three electrodes in the cell. The neutral (bipolar) electrode 30 is at a potential of about 8 V. relative to the cathode. The potential in the brine between the neutral (bipolar) electrode 30 and anode 26 is about 10 V. Anode 26 is at a potential of 12 V. relative to cathode 24.

Under the conditions of operation described above, there is vigorous generation of hydrogen at cathode 24 and a rapid production of sodium hydroxide in cathode compartment 23. Sodium hydroxide is the natural product obtained when the sodium ions passing through ion-permeable membrane 21 are neutralized at cathode 24. The resulting product is sodium metal which is almost instantly converted into sodium hydroxide with evolution of hydrogen. At the same time, there is vigorous generation of the gas mixture in the anode compartment 22 at both the neutral (bipolar) electrode 30 and the anode 26. The evolution of gas commences almost immediately compared to a relatively long induction period for production of chlorine in conventional electrolytic chlorine generators.

In the start up of a chlorine generator, there is usually a substantial induction, or lag time which results from the low conductivity in the cathode compartment. Usually, the operation of the cell is relatively slow until sufficient sodium ions have been converted into sodium hydroxide at the cathode 24 and the caustic solution has reached a sufficient level of concentration to be highly electrically conductive. Likewise, in the anode compartment, there is usually an induction, or lag time resulting from the solubility of chlorine in water, particularly when the chlorine is generated slowly.

In this improved electrolytic generator there is a more rapid build up of sodium hydroxide in the cathode compartment as a result of the short distance that the sodium ions must travel from the neutral (bipolar) electrode 30 to pass through ion-permeable membrane 21. Also, in this generator, the generation of the gas mixture at anode 26 and neutral (bipolar) electrode 30 is so vigorous that there is an almost immediate generation of gas from the cell. The productivity of this cell was initially evaluated using the DPD colorimetric method of measuring residual chlorine in water. Data showed that, at worst cell operating conditions and no temperature problems, production of 1 lb. of chlorine-containing gas per day was easily obtained at a current of 11 A. and only 5 gal. of brine solution. There was no long loss of time for start up and waiting for solutions to be concentrated with salt or caustic levels to rise. In conventional electrolytic chlorine generators the lag time in start up has often been days.

In later experiments, the production of gas in the anode compartment seemed to be greater than theoretical. It was then that chlorine dioxide was discovered as a significant component of the gas produced. The anode compartment gas was collected and bubbled through an absorber for chlorine and the residue analyzed for chlorine dioxide content. The chlorine dioxide was found to be the major constituent of the gas produced in the anode compartment at both the anode 26 and the neutral (bipolar) electrode 30

In experimental work carried out with this electrolytic generator cell, a number of important observations were made. The resistance of the anode compartment is directly related to the distance of the anode to the cathode and the saturation of salt in the electrolytic solution. The production of the gas mixture at the anode and the neutral (bipolar) electrode and the production of hydrogen at the cathode are directly related to the surface area of these electrodes and the current density. With a greater area of anode surface and neutral (bipolar) electrode surface and a higher current, more gas production occurs. The current flow however is limited by the resistance of the solution in the anode compartment and the rate of flow of sodium ions through ion-permeable membrane 21. The rate of flow of sodium ions through the membrane is also directly related to the caustic level of sodium hydroxide in the solution in cathode compartment 23 and is also related to the area of ion-permeable membrane 21. At higher operating pressures, the cell produces a greater amount of chlorine oxides, while at low pressures, the output comprises greater amounts of oxygen species.

By placing neutral (bipolar) electrode 30 in the cell and locating the electrode in line between cathode 24 and anode 26 adjacent to ion-permeable membrane 21, substantial advantages are obtained. Neutral (bipolar) electrode 30 acts as an anode relative to cathode 24 and also acts as a cathode relative to anode 26. In this manner, neutral (bipolar) electrode 30 assists in effecting a rapid transfer of sodium ions to cathode compartment 23 and improves the rate of build up of caustic in that compartment. It also functions to improve the chlorine/chlorine dioxide output and to reduce the induction period or start up time for the cell.

Tests carried out with this equipment using 6"×12" cathode, 6"×12"×2" anode, 6"×12"×2" neutral (bipolar) electrode and a 2½"×8" ion-permeable membrane has shown that once the cell is saturated with salt a high chlorine/chlorine dioxide output can be maintained with a small membrane area being used efficiently. The optimum size for the ion-permeable membrane 21 is probably an area not substantially greater than the area required to conduct the maximum current used in the chlorine/chlorine dioxide generator cell. The cathode 24, anode 26 and neutral (bipolar) electrode 30 are preferably about the same surface area. Some difference in surface are may be used in certain specialized applications as will be described in connection with certain of the alternate embodiments of this invention.

The removal of chlorine/chlorine dioxide mixture and hydrogen and of caustic solution from the chlorine generator cell 4 is shown schematically, as is the introduction of water and table salt to the generator. Specific construction involves conventional structure in electrolytic cells and in gas recovery from such cells. The collection of hydrogen and of the chlorine/chlorine dioxide mixture may involve simple gas collection apparatus and may, if desired, involve the use of systems for mixing the hydrogen and chlorine/chlorine dioxide gas mixture with water for introduction into a body of water as described in connection with FIG. 1 above. Also, the equipment can be used in association with timers or in connection with flow controlling switches or controls or in connection with pressure responsive switches and controls as is well known in the prior art.

When the cell is operated with low salt concentrations, i.e. just sufficient to maintain electrical conductivity, the production of chlorine virtually disappears, and the product gases predominate in oxygen and ozone, with some production of hydrogen peroxide in the liquid phase. When air, or pure oxygen, is circulated through the anode compartment during the electrolysis, the production of ozone is increased. In carrying out the treatment of cellulosic wastes according to the present invention, the operation of the cell under conditions which emphasize the production of chlorine dioxide and ozone are preferred.

The mixed oxidant gas is absorbed in aqueous alkaline solution. The solubility increases with increase in pH of the solution. Mixed oxidant gas solutions have concentrations of 0.01–7.0% as the pH increases from about 7.5 up to about 12.0. These solutions are used in the method shown in FIG. 1 and the gases in the method of FIG. 2.

ALTERNATE EMBODIMENTS OF THE APPARATUS

In FIGS. 6 to 17 there are shown a number of alternate embodiments of the oxidant gas generator shown in FIGS. 4 and 5. In these views, the oxidant gas generator is shown in plan view as in FIG. 5 and is illustrated in a variety of forms using different arrangements of neutral (bipolar) electrodes and/or different configurations of electrodes.

Figure 6:
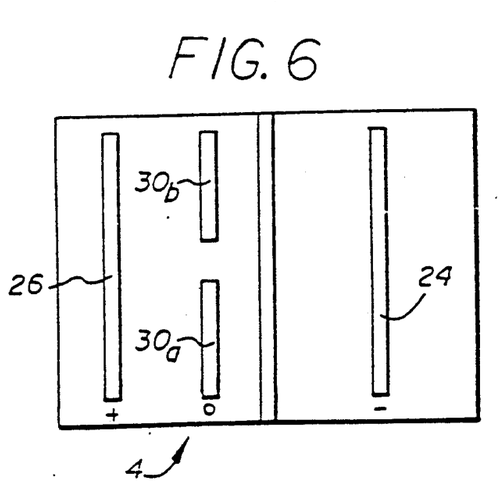
FIG. 6 is a plan view of another embodiment of electrolytic generator, for use in the method or system shown in FIGS. 1 or 2, having a plurality of neutral (bipolar) electrodes.

In FIG. 6, the oxidant gas generator 4 has anode 26 and cathode 24 as in FIGS. 4 and 5. Neutral (bipolar) electrode 30, however, is provided as two separate electrodes 30a and 30b. When the cell is operated with low salt concentrations, i.e. just sufficient to maintain electrical conductivity, the production of chlorine virtually disappears, and the product gases predominate in oxygen and ozone, with some production of hydrogen peroxide in the liquid phase. When air, or pure oxygen, is circulated through the anode compartment during the electrolysis, production of ozone is increased.

The mixed oxidant gas is absorbed in aqueous alkaline solution. The solubility increases with increase in pH of the solution. Mixed oxidant gas solutions have concentrations of 0.01–7.0% as the pH increases from about 7.5 up to about 12.0. These solutions are used in the method shown in FIG. 1 and the gases in the method of FIG. 2.

Figure 7:
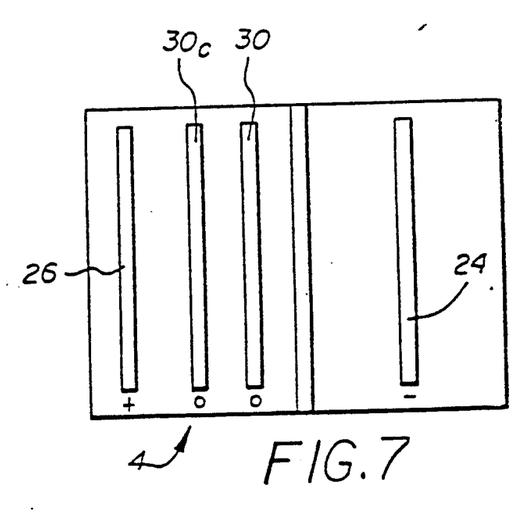
FIG. 7 is a plan view of another embodiment of electrolytic generator, for use in the method or system shown in FIGS. 1 or 2, having a plurality of neutral (bipolar) electrodes aligned in series.

In FIG. 7, oxidant gas generator 4 has cathode 24 and anode 26 as in FIGS. 2 and 3. In this embodiment, neutral (bipolar) electrode 30 is positioned adjacent to the ion-permeable membrane and a second neutral (bipolar) electrode 30c is positioned between the electrode 30 and anode 26. When the circuit is energized, oxidant gas production occurs at anode 26 and at each of the neutral (bipolar) electrodes 30 and 30c. When the cell is operated with low salt concentrations, i.e. just sufficient to maintain electrical conductivity, the production of chlorine virtually disappears, and the product gases predominate in oxygen and ozone, with some production of hydrogen peroxide in the liquid phase. When air, or pure oxygen, is circulated through the anode compartment during the electrolysis, the production of ozone is increased.

The mixed oxidant gas is absorbed in aqueous alkaline solution. The solubility increases with increase in pH of the solution. Mixed oxidant gas solutions have concentrations of 0.01–7.0% as the pH increases from about 7.5 up to about 12.0. These solutions are used in the method shown in FIG. 1 and the gases in the method of FIG. 2.

Figure 8:
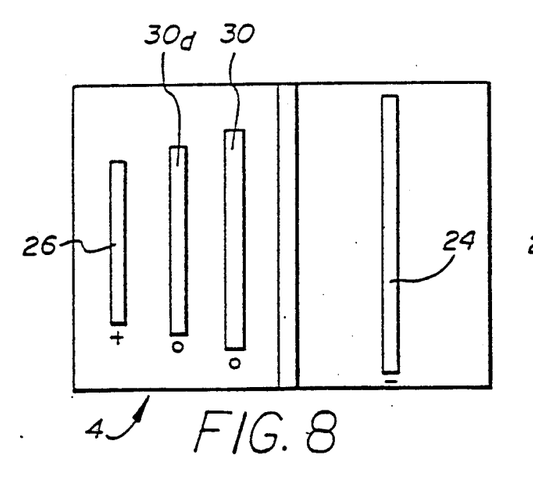
FIG. 8 is a plan view of still another embodiment of electrolytic generator, for use in the method or system shown in FIGS. 1 or 2, having a plurality of neutral (bipolar) electrodes and an anode of diminishing size.

In FIG. 8, oxidant gas generator 4 has an anode 26 which is appreciably smaller in area than cathode 24. Neutral (bipolar) electrodes 30 and 30d are graduated in size between the large size or cathode 24 and the small size or cathode 26. When the cell is operated with low salt concentrations, i.e. just sufficient to maintain electrical conductivity, the production of chlorine virtually disappears, and the product gases predominate in oxygen and ozone, with some production of hydrogen peroxide in the liquid phase. When air, or pure oxygen, is circulated through the anode compartment during the electrolysis, the production of ozone is increased.

The mixed oxidant gas is absorbed in aqueous alkaline solution. The solubility increases with increase in pH of the solution. Mixed oxidant gas solutions have concentrations of 0.01–7.0% as the pH increases from about 7.5 up to about 12.0. These solutions are used in the method shown in FIG. 1 and the gases in the method of FIG. 2.

Figure 9:
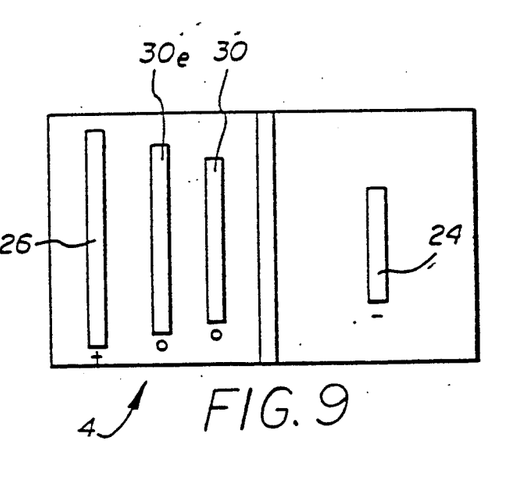
FIG. 9 is a plan view of still another embodiment of electrolytic generator, for use in the method or system shown in FIGS. 1 or 2, having a plurality of neutral electrodes and an anode of increasing size.

In FIG. 9, oxidant gas generator 4 has a cathode 24 of relatively small size and anode 26 of substantially larger size. Neutral (bipolar) electrodes 30 and 30e are graduated in size. When the cell is operated with low salt concentrations, i.e. just sufficient to maintain electrical conductivity, the production of chlorine virtually disappears, and the product gases predominate in oxygen and ozone, with some production of hydrogen peroxide in the liquid phases. When air, or pure oxygen, is circulated through the anode compartment during the electrolysis, the production of ozone is increased.

Figure 10:
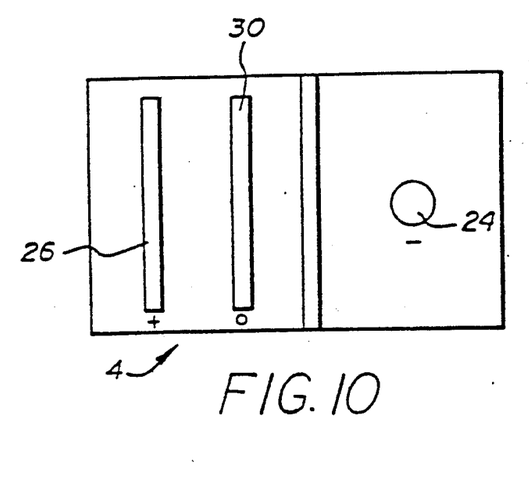
FIG. 10 is a plan view of still another embodiment of electrolytic generator, for use in the method or system shown in FIGS. 1 or 2, having a cylindrical cathode and flat plate electrodes and an anode.

In FIG. 10, oxidant gas generator 4 is substantially the same as that shown in FIG. 5, except that cathode 24 is a cylindrical rod.

Figure 11:
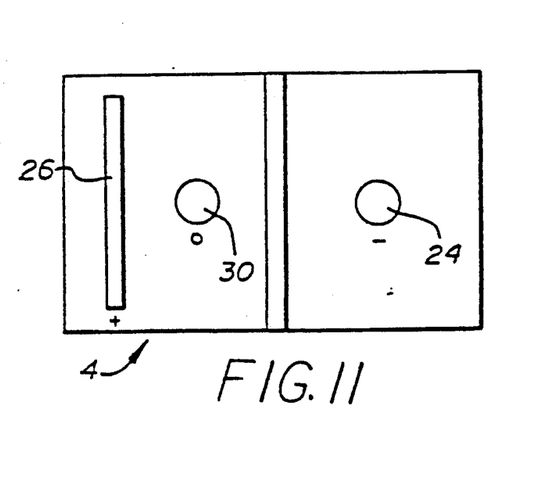
FIG. 11 is a plan view of still another embodiment of electrolytic generator, for use in the method or system shown in FIGS. 1 or 2, in which the cathode and the neutral (bipolar) electrode are cylindrical.

In FIG. 11, oxidant gas generator 4 has a cylindrical cathode 24 flat plate anode 26 and cylindrical rod neutral (bipolar) electrode 30.

Figures 12, 13, 14, 15:
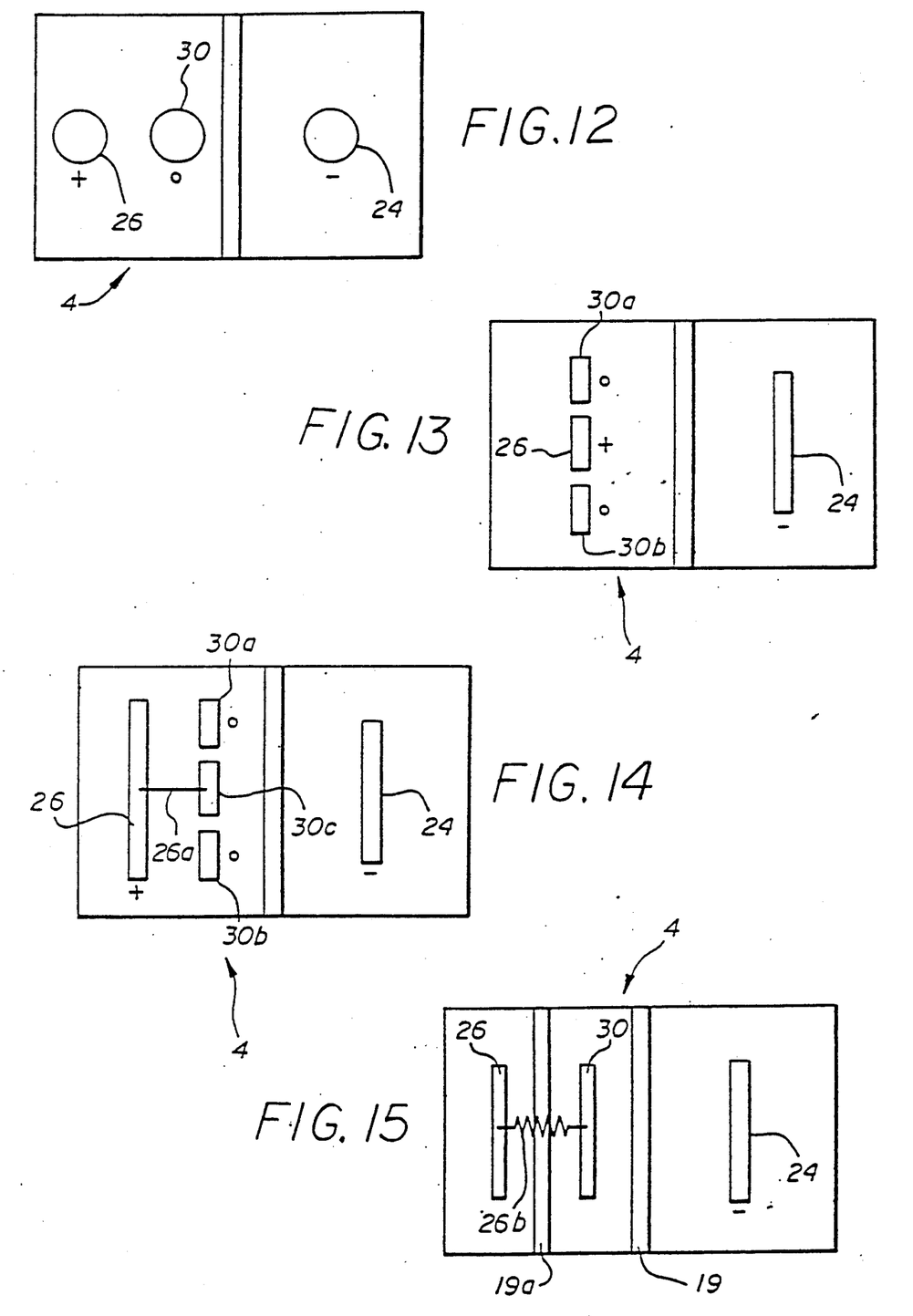
FIG. 12 is a plan view of still another embodiment of electrolytic generator, for use in the method or system shown in FIGS. 1 or 2, in which the cathode, anode and neutral (bipolar) electrode are all cylindrical in shape.
FIG. 13 is a schematic plan view of another embodiment of electrolytic generator, for use in the method or system shown in FIGS. 1 or 2, in which the neutral (bipolar) electrodes are positioned adjacent to the anode.
FIG. 14 is a schematic plan view of another embodiment of electrolytic generator, for use in the method or system shown in FIGS. 1 or 2, in which a plurality of neutral (bipolar) electrodes are positioned side-by-side between the anode and cathode.
FIG. 15 is a schematic plan view of another embodiment of electrolytic generator, for use in the method or system shown in FIGS. 1 or 2, in which the neutral (bipolar) element is separated from the anode and cathode compartment by ion-permeable membranes.

In FIG. 12, oxidant gas generator 4 has cathode 24, anode 26 and neutral (bipolar) electrode 30 all in the form of cylindrical rods. In each of these cases, the cylindrical rod cathode is of a metal such as stainless steel and the anode 26 and neutral (bipolar) electrode 30 are preferably of carbon either in the form of a flat-plate or cylindrical rod as shown.

In the several embodiments having multiple neutral (bipolar) electrodes 30, viz. FIG. 6, FIG. 7, FIG. 8, and FIG. 9, the oxidant gas generation takes place at the anode 26 and at each of the separate neutral (bipolar) electrodes. A plurality of neutral (bipolar) electrodes, two or more, may be used as desired. Oxidant gas generation takes place at each of the electrodes and the anode. In the embodiment shown in FIG. 8 the current flow is focused from a large cathode 24 through sequentially smaller neutral (bipolar) electrodes 30 and 30d to a smaller anode 26 to provide a higher current density. The reverse effect is obtained in FIG. 9 where the graduated neutral (bipolar) electrodes and 30 and 30e focus a high current from a small cathode 26 on to a larger anode 26. The embodiments in FIGS. 10, 11, and 12 illustrate the effect of substitution of cylindrical electrodes in the oxidant gas generator cell.

In FIG. 13, there is shown another embodiment of the invention in which the neutral (bipolar) electrodes 30a and 30b are located adjacent to anode 26 and aligned therewith. In this embodiment, the neutral (bipolar) electrodes are spaced at the same distance from the cathode 24 as anode 26 rather than being in line between the anode and cathode. The neutral (bipolar) electrodes are preferably spaced closely to each side of anode 26 but not in physical contact therewith. When this embodiment is filled with saturated aqueous chloride salt, as in the other embodiments, and energized, the gas evolved at anode 26 contains 1.5 parts chlorine dioxide per part chlorine.

The mixed oxidant gas is absorbed in aqueous alkaline solution. The solubility increases with increase in pH of the solution. Mixed oxidant gas solutions have concentrations of 0.01–7.0% as the pH increases from about 7.5 up to about 12.0. These solutions are used in the method shown in FIG. 1 and the gases in the method of FIG. 2.

In FIG. 14, there is shown still another embodiment of the invention in which a plurality of electrodes 30a, 30b and 30c are positioned side-by-side between anode 26 and cathode 24. Electrodes 30a, 30b and 30c are also considered to be positioned in parallel in an electrical sense since they represent parallel paths for current flow between anode 26 and cathode 24. The central electrode 30c is connected by lead 26a to anode 26 and is thus maintained at the same potential as anode 26, less any voltage drop through the lead, relative to cathode 24. When this embodiment is energized, the output from electrode 30c is pure chlorine dioxide while the output from anode 26 is a mixture of chlorine and chlorine dioxide.

In FIG. 15, there is shown an embodiment of the invention in which electrode 30 is isolated from both the cathode 24 and anode 26 by separators 19 and 19a, respectively. Anode 26 is connected by a resistor 26a to electrode 30 to maintain the same at a lower potential than the anode relative to cathode 24. When this embodiment is energized, the output from electrode 30 is pure chlorine while the output from anode 26 is a mixture of a major amount of chlorine dioxide and a minor amount of chlorine. When the same cell is operated with resistor 26a and omitting divider 19a, the voltage drop through the resistor maintains the electrode 30 at a lower potential than anode 26 relative to cathode 24 and produces an enhanced mixed oxidant gas. A structure equivalent to this embodiment is produced by having electrode 30 connected directly to anode 26 but having an coating which results in a voltage drop. Likewise, an external connection between electrode 30 and anode 26 producing a voltage drop gives the same effect.

The mixed oxidant gas from this cell is absorbed in aqueous alkaline solution. The solubility increases with increase in pH of the solution. Mixed oxidant gas solutions have concentrations of 0.01–7.0% as the pH increases from about 7.5 up to about 12.0. These solutions are used in the method shown in FIG. 1 and the gases in the method of FIG. 2.

Figure 16:
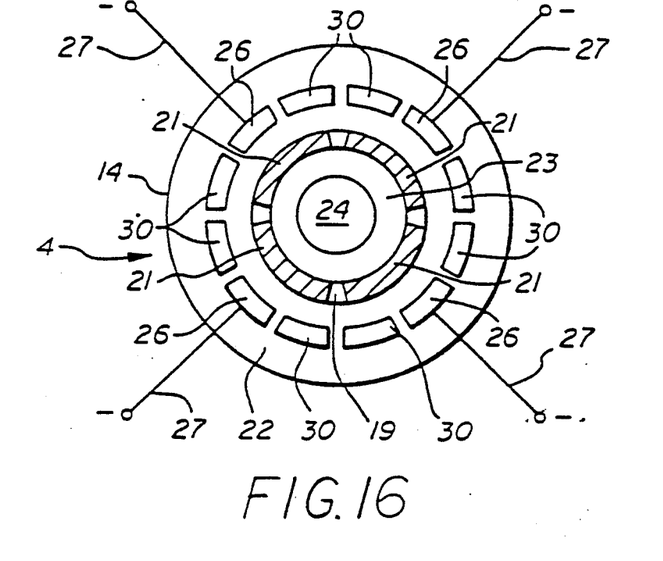
FIG. 16 is a schematic view of a cylindrical electrolytic generator for use in the method or system shown in FIGS. 1 or 2.

In FIG. 16, there is shown a further embodiment in which electrolytic generator 4 is housed in a cylindrical container 14. Separator wall 19 is cylindrical and divides the generator into anode compartment 22 and cathode compartment 23. Separator wall 19 includes a plurality of ion-permeable membranes 21. Cathode 24 is positioned in compartment 23 and is connected to the D.C. power source. A plurality of anodes 26 are spaced around anode compartment 22. A plurality of neutral (bipolar) electrodes 30 are positioned between anodes 26. Anodes 26 are connected to a common lead or connection to the power source. When energized, this generator produces hydrogen from compartment 23 and chlorine dioxide and a small amount of chlorine from compartment 22.

The mixed oxidant gas from this cell is absorbed in aqueous alkaline solution. The solubility increases with increase in pH of the solution. Mixed oxidant gas solutions have concentrations of 0.01–7.0% as the pH increases from about 7.5 up to about 12.0. These solutions are used in the method shown in FIG. 1 and the gases in the method of FIG. 2.

Figure 17:
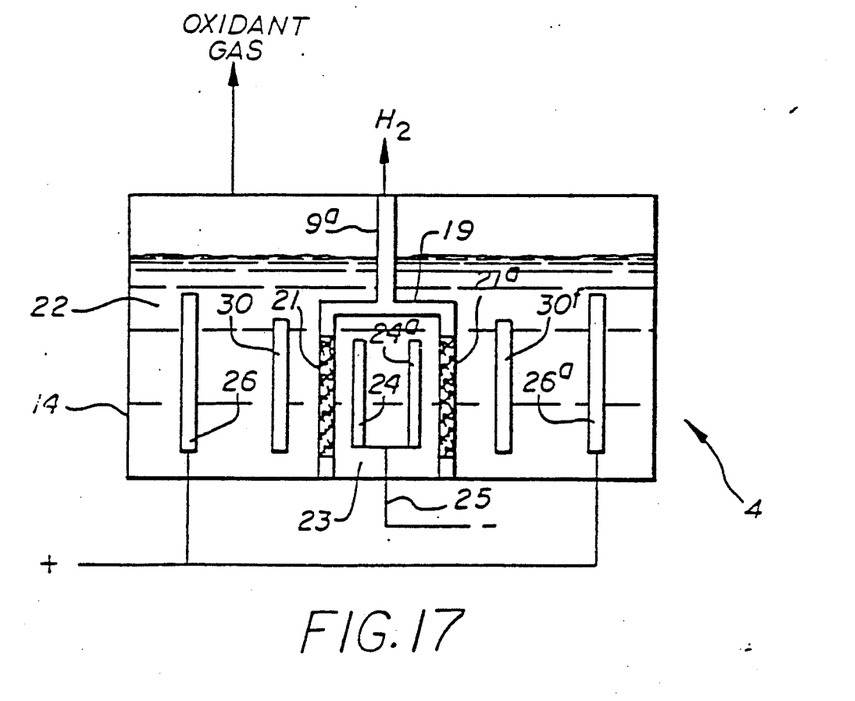
FIG. 17 is a schematic view, in elevation, of still another embodiment of electrolytic generator, for use in the method or system shown in FIGS. 1 or 2, having a pair of cathodes and a pair of anodes.

In FIG. 17, there is shown still a further embodiment of the invention in the form of a double cell. Chlorine-chlorine dioxide generator 4 consists of hollow container 14 having wall 19 completely enclosing the cathode chamber 23. A pair of ion-permeable membranes 21 and 21a are positioned on opposite sides of wall 19. A pair of cathodes 24 and 24a are provided in cathode compartment 23 and are connected to the electric circuit by lead 25. A conduit 9a leads from the end wall portion of wall 19 to conduct hydrogen from cathode compartment 23.

Anode compartment 22 completely surrounds wall 19 and the liquid level completely covers cathode chamber 23. A pair of anodes 26 and 26a are provided. A pair of neutral (bipolar) electrodes 30 and 30f are provided and positioned in direct line between the respective cathodes and anodes, and adjacent to the ion-permeable membrane. Chlorine is produced from each of the anodes 26 and 26a and the neutral (bipolar) electrodes 30 and 30f and hydrogen and caustic are produced in cathode chamber cell is the same as the other embodiments, except that the number of electrodes is doubled.

The mixed oxidant gas is absorbed in aqueous alkaline solution. The solubility increases with increase in pH of the solution. Mixed oxidant gas solutions have concentrations of 0.01-7.0% as the pH increases from about 7.5 up to about 12.0. These solutions are used in the method shown in FIG. 1 and the gases in the method of FIG. 2.

TREATMENT OF CELLULOSIC WASTES

Example I—Control

As a control, a quantity of chopped wheat straw (0.25-0.50" pieces) was treated to improve digestability by a procedure under investigation at a number of universities. The wheat straw was treated by spraying with 50% aqueous alkali (NaOH) to yield a pH of 11.4-11.7 on the straw (about 5% NaOH on the straw). The alkaline treated straw was then treated with aqueous alkaline hydrogen peroxide until the water content of the straw was about 35%. The treatment was carried out at 55° C.

The straw had an initial composition of about 66% dry matter and was about 38% digestible by ruminants (cattle) prior to treatment. The dry matter was 86% organic, about 56% cellulose and lignin.

After allowing the chopped straw to set for several hours to react, the product was evaluated by subjecting it to contact with the stomach digestive juices of the ruminant and the amount digested determined by weight loss. The product obtained in this manner had a digestability of 79.7%. The several hours reaction time as used in this and succeeding Examples refers to a time from about five hours up to several days depending upon whether the digestability tests were run in the local laboratory or shipped to one of the universities for evaluation in their testing program.

The use of aqueous alkaline hydrogen peroxide in this procedure is quite expensive and has made the process economically unsound. When attempts were made to reduce the amount of hydrogen peroxide substantially, the digestability of the product dropped off drastically. For example, using a 4% aqueous alkaline hydrogen peroxide, under the same general procedure, results in a product with a digestability of about 50%. If the hydrogen peroxide concentration is reduced to 1%, the digestability is hardly improved at all over the untreated straw. Similar results are obtained using other cellulosic wastes, such as chopped cotton gin trash, corn husks, peanut shells, saw dust, etc.

Example II—Mixed Oxidant Solution Treatment

A mixed oxidant gas generator, as shown in FIG. 4, was operated to produce a mixed-oxidant gas comprising a mixture of chlorine, chlorine oxides, and various oxygen species, such as oxygen, hydrogen peroxide, ozone, etc. The mixed oxidant gas was absorbed into aqueous alkali at pH 12.0 to produce a solution containing 0.7% mixed oxidants (7000 ppm.). Sufficient solution was sprayed on dry chopped wheat straw to produce a pH of 11.5 on the straw and a water content of 35%.

After allowing the chopped straw to set for several hours to react, the product was evaluated by subjecting it to contact with the stomach digestive juices of the ruminant and the amount digested determined by weight loss. The product obtained in this manner had a digestability of about 57%. Product produced by treatment of an equivalent amount of alkaline hydrogen peroxide has a digestability of about 40%.

Example III—Mixed Oxidant Solution Treatment

A mixed oxidant gas generator, as shown in FIG. 4, was operated to produce a mixed-oxidant gas comprising a mixture of chlorine, chlorine oxides, and various oxygen species, such as oxygen, hydrogen peroxide, ozone, etc. The mixed oxidant gas was absorbed into aqueous alkali at pH 12.0 to produce a solution containing 0.37% mixed oxidants (3700 ppm.). 40 ml. mixed oxidant solution were mixed with 40 ml. of 50% aqueous NaOH and then diluted with 200 ml water. Sufficient solution was sprayed on dry chopped wheat straw to produce a pH of 11.6 on the straw and a water content of 35% after mixing for one minute.

After allowing the chopped straw to set for several hours to react, the product was evaluated by subjecting it to contact with the stomach digestive juices of the ruminant and the amount digested determined by weight loss. The product obtained in this manner had a digestability of about 62%. Product produced by treatment of an equivalent amount of alkaline hydrogen peroxide has a digestability of about 40%. Additional runs were made where the amounts of 50% NaOH solution mixed with the 40 ml. of 0.37% mixed oxidant solution were reduced to 10 ml. and 5 ml., respectively. The digestability of the respective products were 38% and 27%.

Example IV—Mixed Oxidant Solution Treatment

A mixed oxidant gas generator, as shown in FIG. 4, was operated to produce a mixed-oxidant gas comprising a mixture of chlorine, chlorine oxides, and various oxygen species, such as oxygen, hydrogen peroxide, ozone, etc. The mixed oxidant gas was absorbed into aqueous alkali at pH 12.0 to produce a solution containing 0.88% mixed oxidant (8800 ppm.). 200 ml mixed oxidant solution were mixed with 120 ml. of 50% aqueous NaOH. Sufficient solution was sprayed on dry chopped wheat straw to produce a pH of 11.6 on the straw and a water content of 35% after mixing for ten minutes.

After allowing the chopped straw to set for several hours to react, the product was evaluated by subjecting it to contact with the stomach digestive juices of the ruminant and the amount digested determined by weight loss. Product obtained in this manner had a digestability of more than 80%. Product produced by treatment of an equivalent amount of alkaline hydrogen peroxide has a digestability of about 40%.

Example V—Mixed Oxidant Solution Treatment

A mixed oxidant gas generator, as shown in FIG. 4, was operated to produce a mixed-oxidant gas comprising a mixture of chlorine, chlorine oxides, and various oxygen species, such as oxygen, hydrogen peroxide, ozone, etc. The mixed oxidant gas was absorbed into aqueous alkali at pH 12.0 to produce a series of solutions containing from 0.014% mixed oxidants (140 ppm.) up to 6.7% mixed oxidants (67,000 ppm.). 200 ml. of the respective mixed oxidant solutions were mixed with 120 ml. of 50% aqueous NaOH. Sufficient solution was sprayed on dry chopped wheat straw to produce a pH of 11.6 on the straw and a water content of 35%, after mixing for ten minutes.

After allowing the chopped straw to set for several hours to react, the products were evaluated by subjection to contact with the stomach digestive juices of the ruminant and the amount digested determined by weight loss. The results are tabulated in Table I below:

TABLE I
Effects of Oxidant Concentration

| Run No. | pH | Oxidant Concentration | % Digestability |
|---|---|---|---|
| A-1 | 11.6 | 140 ppm. | 47 |
| A-2 | 11.6 | 700 ppm. | 42 |
| A-3 | 11.6 | 3,800 ppm. | 46 |
| A-4 | 11.6 | 6,500 ppm. | 40 |
| A-5 | 11.6 | 8,800 ppm. | 70 |
| A-6 | 11.6 | 21,000 ppm. | 44 |
| A-7 | 11.6 | 30,000 ppm. | 48 |
| A-7a | 11.8 | 30,000 ppm. | 54 |
| A-7b | 12.0 | 30,000 ppm. | 58 |
| A-8 | 11.6 | 42,000 ppm. | 50 |
| A-9 | 11.6 | 67,000 ppm. | 55 |

In the conversion of the cellulosic wastes to a more digestible form, there is a release of lignin an an acid form which lowers the pH of the product considerably, and accompanied by conversion of at least some of the cellulose to sugars.

Example VI—Mixed Oxidant Solution Treatment

A mixed oxidant gas generator, as shown in FIG. 4, was operated to produce a mixed-oxidant gas comprising a mixture of chlorine, chlorine oxides, and various oxygen species, such as oxygen, hydrogen peroxide, ozone, etc. The mixed oxidant gas was absorbed into aqueous alkali at pH 12.0 to produce solutions containing 0.88% mixed oxidant (8800 ppm.), 2.1% mixed oxidant (21,000 ppm.) and 6.7% mixed oxidants (67,000 ppm.) respectively. 200 ml. of each of the various mixed oxidant solutions were mixed with 120 ml. of 50% aqueous NaOH. Sufficient solution was sprayed on dry chopped what straw to produce a pH of 11.6 on the straw and a water content of 35% after mixing for ten minutes.

After allowing the chopped straw to set for several hours to react, the products were evaluated by subjection to contact with the stomach digestive juices of the ruminant and the amount digested determined by weight loss. The results are tabulated in Table I below:

TABLE I
Effects of Oxidant Concentration

| Run No. | pH | Oxidant Concentration | % Digestability |
|---|---|---|---|
| 1 | 11.6 | 8800 ppm. | 66 |
| 2 | 11.4 | 8800 ppm. | 72 |
| 3 | 11.4 | 8800 ppm. | 63 |
| 4 | 11.4 | 21,000 ppm. | 61 |
| 5 | 11.6 | 67,000 ppm. | 55 |

In the conversion of the cellulosic wastes to a more digestible form, there is a release of lignin an acid form which lowers the pH of the product considerably, and accompanied by conversion of at least some of the cellulose to sugars.

Example VII—Mixed Oxidant Solution Treatment

A mixed oxidant gas generator, as shown in FIG. 4, was operated to produce a mixed-oxidant gas comprising a mixture of chlorine, chlorine oxides, and various oxygen species, such as oxygen, hydrogen peroxide, ozone, etc. The mixed oxidant gas was absorbed into aqueous alkali at pH 12.0 to produce a solution containing 0.88% mixed oxidant (8800 ppm.). 200 ml. mixed oxidant solution were mixed with 120 ml. of 50% aqueous NaOH. Sufficient solution was sprayed on dry chopped gin trash (cotton bolls, stems, etc.) to produce a pH of 11.9 (which is lowered rapidly as lignin is released) and a water content of 35% in the gin trash and mixed for one minute.

After allowing the chopped gin trash to set for several hours to react, the product was evaluated by subjecting it to contact with the stomach digestive juices of the ruminant and the amount digested determined by weight loss. The product obtained in this manner had a digestability of about 67%. The digestability of an untreated control is about 36%. Product produced by treatment of an equivalent amount of alkaline hydrogen peroxide has a digestability of about 37%.

Example VIII—Mixed Oxidant Solution Treatment

A mixed oxidant gas generator, as shown in FIG. 4, was operated to produce a mixed-oxidant gas comprising a mixture of chlorine, chlorine oxides, and various oxygen species, such as oxygen, hydrogen peroxide, ozone, etc. The mixed oxidant gas was absorbed into aqueous alkali at pH 12.0 to produce a solution containing 0.88% mixed oxidant (8800 ppm.). 200 ml. mixed oxidant solution were mixed with 120 ml. of 50% aqueous NaOH. Sufficient solution was sprayed on dry chopped gin trash (cotton bolls, stems, etc.) to produce a pH of 11.4 and a water content of 35% in the gin trash and mixed for five minutes.

After allowing the chopped gin trash to set for several hours to react, the product was evaluated by subjecting it to contact with the stomach digestive juices of the ruminant and the amount digested determined by weight loss. The product obtained in this manner had a digestability of about 64%. The digestability of an untreated control is about 36%. Product produced by treatment of an equivalent amount of alkaline hydrogen peroxide has a digestability of about 37%.

Example IX—Mixed Oxidant Solution Treatment

A mixed oxidant gas generator, as shown in FIG. 4, was operated to produce a mixed-oxidant gas comprising a mixture of chlorine, chlorine oxides, and various oxygen species, such as oxygen, hydrogen peroxide, ozone, etc. The mixed oxidant gas was absorbed into aqueous alkali at pH 12.0 to produce a solution containing 2.0% mixed oxidant (20,000 ppm.). 200 ml. mixed oxidant solution were mixed with 120 ml. of 50% aqueous NaOH. Sufficient solution was sprayed on dry chopped gin trash (cotton bolls, stems, etc.) to produce a pH of 11.6 and a water content of 35% in the gin trash and mixed for ten minutes.

After allowing the gin trash straw to set for several hours to react, the product was evaluated by subjecting it to contact with the stomach digestive juices of the ruminant and the amount digested determined by weight loss. The product obtained in this manner had a digestability of about 46.5%. The digestability of an untreated control is about 36%. Product produced by treatment of an equivalent amount of alkaline hydrogen peroxide has a digestability of about 39%.

Example X—Mixed Oxidant Solution Treatment

A mixed oxidant gas generator, as shown in FIG. 4, was operated to produce a mixed-oxidant gas comprising a mixture of chlorine, chlorine oxides, and various oxygen species, such as oxygen, hydrogen peroxide, ozone, etc. The mixed oxidant gas was absorbed into aqueous alkali at pH 12.0 to produce a solution containing 6.7% mixed oxidants (67,000 ppm.). 200 ml. mixed oxidant solution were mixed with 120 ml. of 50% aqueous NaOH. Sufficient solution was sprayed on dry chopped gin trash (cotton bolls, stems, etc.) to produce a pH of 11.6 and a water content of 35% in the gin trash after mixing for five minutes.

After allowing the chopped gin trash to set for several hours to react, the product was evaluated by subjecting it to contact with the stomach digestive juices of the ruminant and the amount digested determined by weight loss. The product obtained in this manner had a digestability of about 46%. The digestability of an untreated control is about 36%. Product produced by treatment of an equivalent amount of alkaline hydrogen peroxide has a digestability of about 39%.

Example XI—Mixed Oxidant Gas Treatment

A mixed oxidant gas generator, as shown in FIG. 4, is operated to produce a mixed-oxidant gas comprising a mixture of chlorine, chlorine oxides, and various oxygen species, such as oxygen, hydrogen peroxide, ozone, etc. The mixed oxidant gas is circulated through chopped straw which has been sprayed with 50% aqueous NaOH to produce a pH of 11.5 on the straw and a water content of 35% and the straw turns brown in color.

After allowing the chopped straw to set for several hours to react, the product is evaluated by subjecting it to contact with the stomach digestive juices of the ruminant and the amount digested determined by weight loss. The product obtained in this manner has a digestability of about 54%. Product produced by treatment with an equivalent amount of alkaline hydrogen peroxide has a digestability of about 40%.

Example XII—Mixed Oxidant Gas Treatment

A mixed oxidant gas generator, as shown in FIG. 4, is operated to produce a mixed-oxidant gas comprising a mixture of chlorine, chlorine oxides, and various oxygen species, such as oxygen, hydrogen peroxide, ozone, etc. The mixed oxidant gas is circulated through chopped gin trash which has been sprayed with aqueous NaOH to produce a pH of 11.5 on the straw and a water content of 35% and the gin trash turns brown in color.

After allowing the chopped straw to set for several hours to react, the product is evaluated by subjecting it to contact with the stomach digestive juices of the ruminant and the amount digested determined by weight loss. The product obtained in this manner has a digestability of about 56%. Product produced by treatment with an equivalent amount of alkaline hydrogen peroxide has a digestability of about 40%.

Example XIII—Mixed Oxidant Solution Treatment

A mixed oxidant gas generator, as shown in FIG. 4, is operated to produce a mixed-oxidant gas comprising a mixture of chlorine, chlorine oxides, and various oxygen species, such as oxygen, hydrogen peroxide, ozone, etc. The mixed oxidant gas is absorbed into aqueous alkali at pH 12.0 to produce a solution containing 0.88% mixed oxidants (8800 ppm.). 200 ml. mixed oxidant solution were mixed with 120 ml. of 50% aqueous NaOH. Sufficient solution is sprayed on dry chopped wheat straw to produce a pH of 11.5 on the straw and a water content of 35% after mixing for ten minutes.

After allowing the chopped gin trash to set for several hours to react, the product has a high sugar content. When the product is slurried in water and fermented, a substantial production of alcohol is obtained. The treated cellulosic wastes represent a satisfactory feed stock for the production of ethanol by fermentation.

Example XIV—Mixed Oxidant Solution Treatment

A mixed oxidant gas generator, as shown in FIG. 4, is operated to produce a mixed-oxidant gas comprising a mixture of chlorine, chlorine oxides, and various oxygen species, such as oxygen, hydrogen peroxide, ozone, etc. The mixed oxidant gas is absorbed into aqueous alkali at pH 12.0 to produce a solution containing 0.88% mixed oxidants (8800 ppm.). 200 ml. mixed oxidant solution were mixed with 120 ml. of 50% aqueous NaOH. Sufficient solution is sprayed on dry chopped gin trash to produce a pH of 11.5 on the gin trash and a water content of 35% after mixing for ten minutes.

After allowing the chopped gin trash to set for several hours to react, the product has a high sugar content. When the product is slurried in water and fermented, a substantial production of alcohol is obtained. The treated cellulosic wastes represent a satisfactory feed stock for the production of ethanol by fermentation.

While this invention has been described fully and completely, with special emphasis on several preferred embodiments, it should be understood that, within the scope of the appended claims, the invention may be practiced otherwise than as specifically described.

I claim:

1. A method for treating solid cellulosic wastes to render them edible by ruminants, which comprises
   providing a mixed oxidant gas generator comprising a hollow container having a wall dividing the same into two compartments and including an ion-permeable membrane permitting flow of cations therethrough,
   a cathode in one of said compartments,
   an anode in the other of said compartments,
   providing water to said cathode compartment,
   providing a water solution of a chloride salt to said anode compartment,
   passing a predetermined amount of direct current through said water and said chloride salt solution to produce a mixed oxidant gas in said anode compartment comprising a mixture of chlorine- and oxygen-containing gaseous compounds and to produce hydrogen and sodium hydroxide in said cathode compartment,
   collecting said mixed oxidant gas comprising a mixture of chlorine- and oxygen-containing gaseous compounds,
   providing a quantity of cellulosic wastes, and
   treating said cellulosic wastes with said mixed oxidant gas, comprising a mixture of chlorine- and oxygen-containing gaseous compounds, and aqueous alkali in amounts sufficient to produce a pH of at least 11.0 on said solid wastes and water content of less than 40% in said wastes, said mixed oxidant gas, comprising a mixture of chlorine- and oxygen-containing gaseous compounds, being present in an amount less than about 7.0%, sufficient to convert said wastes after several hours reaction time into a form edible by ruminants and digestible by said ruminants to the extent of 40-80% of said solid wastes.

2. A method according to claim 1 in which said cellulosic wastes comprise straw, corn husks, cotton gin trash, peanut shells, or saw dust.

3. A method according to claim 1 in which said cellulosic wastes are treated to produce a pH of 11.4-11.7 thereon.

4. A method according to claim 1 in which said treatment with mixed oxidant gas and aqueous alkali is by absorbing said mixed oxidant gas from said gas generator in aqueous alkali at a pH of 7.5-12.0 sufficient to produce a solution containing 0.01-7.0% mixed oxidant, mixing the solution with additional aqueous alkali, and applying the solution to said wastes.

5. A method according to claim 4 in which 200 parts of the mixed oxidant solution is mixed with 120 parts of 50% aqueous alkali.

6. A method according to claim 4 in which 200 parts of the mixed oxidant solution containing 0.88% mixed oxidants is mixed with 120 parts of 50% aqueous alkali.

7. A method according to claim 1 in which said cellulosic wastes are treated to produce a pH of 11.4-11.7 thereon, and
said treatment with mixed oxidant gas and aqueous alkali is by absorbing said mixed oxidant gas from said gas generator in aqueous alkali at a pH of 7.5-12.0 sufficient to produce a solution containing 0.01-7.0% mixed oxidant, mixing the mixed oxidant solution with additional aqueous alkali, and applying the solution to said wastes.

8. A method according to claim 1 in which said treatment with mixed oxidant gas and aqueous alkali is by pretreating said wastes with aqueous alkali sufficient to produce a pH of at least 11.0 and a water content of less than 40% therein, and subsequently
treating said wastes with said mixed oxidant gas in an amount sufficient to convert said wastes into a form edible by ruminants.

9. A method according to claim 1 which said wastes are stored for a time ranging from a few hours to several days to complete the reaction converting said wastes into edible form before feeding to ruminants.

10. A method according to claim 1 in which said treated wastes, after completion of reaction, contain cellulose and sugars in a form digestible by ruminants.

11. A method according to claim 1 in which said cellulosic wastes are comminuted before treatment with aqueous alkali and mixed oxidant gas.

12. A method according to claim 1 in which said mixed oxidant gas generator includes an additional electrode positioned in said anode compartment maintained at an electric potential lower than said anode relative to said cathode,
said anode and said cathode being operable when so filled and energized to produce hydrogen at said cathode and a mixed oxidant gas comprising a mixture of chlorine, oxygen and other oxygen species at said anode and at said additional electrode when operated at relatively low salt concentration.

13. A method according to claim 12 in which said additional electrode is a bipolar electrode.

14. A method according to claim 13 in which at least one of the electrodes of said oxidant gas generator has a surface area different from other electrodes.

15. A method according to claim 13 in which there are a plurality of said bipolar electrodes in said oxidant gas generator.

16. A method according to claim 13 in which said ion-permeable membrane comprises only part of said wall of said oxidant gas generator.

17. A method according to claim 13 in which said wall surrounds said second compartment and said first compartment surrounds said wall in said oxidant gas generator.

18. A method according to claim 13 in which said oxidant gas generator container includes openings for introduction of water and a chloride salt and openings for removal of sodium hydroxide and of hydrogen and oxidant gases.

19. A method according to claim 13 in which said oxidant gas generator ion-permeable membrane comprises a perfluorosulfonic polymer.

20. A method according to claim 13 in which said oxidant gas generator ion-permeable membrane comprises a woven membrane of KANECARON fibers, a modacrylic composition of acrylic polymeric structure having 35-85% wt. acrylonitrile units.

21. A method according to claim 13 in which said oxidant gas generator ion-permeable membrane comprises a woven membrane of KANECARON fibers, a modacrylic composition of acrylic polymeric structure having 50% acrylonitrile and 50% vinyl chloride fibers.

22. An edible food for ruminants produced according to the method of claim 1.

23. A method of producing ethanol by fermentation of the product of claim 1.

* * * * *